United States Patent
Bliley et al.

(10) Patent No.: US 11,294,437 B2
(45) Date of Patent: Apr. 5, 2022

(54) ELECTRONICS HOT PLUG PROTECTION

(71) Applicant: Hewlett-Packard Development Company, L.P., Spring, TX (US)

(72) Inventors: Paul D Bliley, Vancouver, WA (US); Tyler Phillip Kapp, Vancouver, WA (US); Duane A Koehler, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 250 days.

(21) Appl. No.: 16/493,710

(22) PCT Filed: Mar. 20, 2017

(86) PCT No.: PCT/US2017/023189
§ 371 (c)(1),
(2) Date: Sep. 12, 2019

(87) PCT Pub. No.: WO2018/174845
PCT Pub. Date: Sep. 27, 2018

(65) Prior Publication Data
US 2020/0033922 A1 Jan. 30, 2020

(51) Int. Cl.
*G06F 1/26* (2006.01)
*H02H 9/02* (2006.01)
*H02H 1/04* (2006.01)

(52) U.S. Cl.
CPC ............ *G06F 1/26* (2013.01); *H02H 1/043* (2013.01); *H02H 9/02* (2013.01)

(58) Field of Classification Search
CPC ............ G06F 1/26; H02H 9/02; H02H 1/043
See application file for complete search history.

(56) References Cited

U.S. PATENT DOCUMENTS

| | | | |
|---|---|---|---|
| 5,886,892 A | 3/1999 | Radley et al. | |
| 6,917,504 B2 | 7/2005 | Nguyen et al. | |
| 6,950,896 B2 | 9/2005 | Scordalakes et al. | |
| 2005/0083615 A1* | 4/2005 | Rose | H01R 29/00 361/18 |
| 2008/0088177 A1* | 4/2008 | Patel | H01R 13/6675 307/12 |
| 2016/0190794 A1 | 6/2016 | Forghani-Zadeh et al. | |

FOREIGN PATENT DOCUMENTS

| | | |
|---|---|---|
| CN | 201075674 | 6/2008 |
| EP | 722584 B1 | 6/2001 |
| JP | 2000197265 | 7/2000 |
| WO | WO-2014/020464 A | 2/2014 |

OTHER PUBLICATIONS

Current Limiting Key to Hot-swap Circuit Protection, Sep. 18, 2002, 5 pages ~ http://www.eetimes.com/.

* cited by examiner

*Primary Examiner* — Scott Bauer
(74) *Attorney, Agent, or Firm* — Fabian VanCott

(57) ABSTRACT

A system for reducing inrush current to an electronic component, the system including: a power supply, the power supply providing power at multiple non-zero voltages; and the electronic component; wherein, when the electronic component is connected to the power supply, the power supply provides a first non-zero voltage to the electronic component and, in response to a signal from the electronic component, provides a second voltage, the second voltage being higher than the first voltage, to the electronic component.

20 Claims, 4 Drawing Sheets though this extra functionality reduces the risk of damaging subsystems or components. This functionality also facilitates hot-swapping of components, where components or subsystems are replaced without powering down the whole system. This may reduce the time and cost of repair operations.

ELECTRONICS HOT PLUG PROTECTION

BACKGROUND

Electronic devices have seen continued increases in complexity and adoption for a wide variety of uses. Devices with more subsystems and/or components may have an increase in the number of potential failure modes. Preventing failures and/or facilitating replacement of failed components are one consideration in designing electronic devices and their subsystem.

BRIEF DESCRIPTION OF THE DRAWINGS

The accompanying drawings illustrate various examples of the principles described herein and are a part of the specification. The illustrated examples do not limit the scope of the claims.

Figure 1:
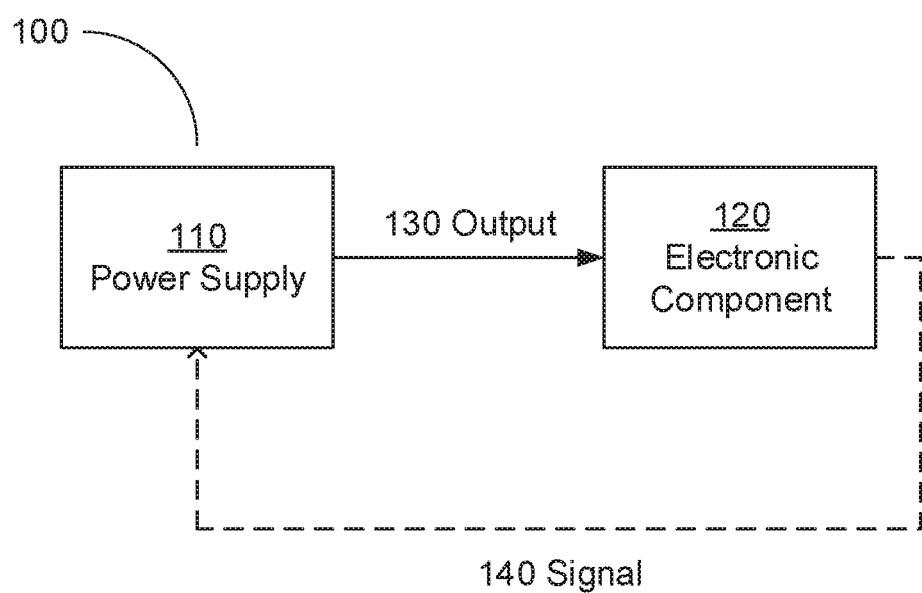
FIG. 1 shows an example of a system for reducing inrush current to an electronic component according to the principles described herein.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

Connecting electronics to a direct current voltage source can produce a surge of current from the power source into the electronics. This power surge is sometimes referred to as inrush current. This power surge may result in brownout to other systems drawing power from the same power source. This power surge may increase the designed capacity of the power supply with the associated costs. This power surge may cause damage to components in the electronics. This issue is sometimes called a hot plug event, to describe connecting the electronics into an active or "hot" power source or plug.

Printing systems include a large number of subsystems and components. These may include subsystems and components that are replaced without powering down the entire printing system. In many cases, the printing system will include a central power supply. The power supply converts alternating current (AC) into a variety of direct current (DC) voltages that are then supplied to various subsystems or components. This approach has a number of advantages, including, the ability to use a central power distribution and control to reduce the overall cost of the system, the ability to power down subcomponents not in use, the ability to regulate modes of subsystems using voltage levels provided, and the ability to support sleep modes.

The availability of a power supply where the output(s) have multiple voltage levels provides a way to minimize inrush currents to powered electronic components or subsystems. Adding this extra functionality reduces the risk of damaging subsystems or components. This functionality also facilitates hot-swapping of components, where components or subsystems are replaced without powering down the whole system. This may reduce the time and cost of repair operations.

For the purposes of this specification and the associated claims, two values are equivalent if both values are within the tolerance range of the other. If a tolerance is not provided, the tolerance is +/−10%.

For the purposes of this specification and the associated claims, a hot plug event refers to a hot plug event associated with excessive inrush current, where the inrush current is excessive if the inrush current causes damage or reduced functionality of components, subsystems, and/or the associate system.

Among other examples, this specification describes a system for reducing inrush current to an electronic component, the system including: a power supply, the power supply providing power at multiple non-zero voltages; and the electronic component; wherein, when the electronic component is connected to the power supply, the power supply provides a first non-zero voltage to the electronic component and, in response to a signal from the electronic component, provides a second voltage, the second voltage being higher than the first voltage, to the electronic component.

This specification also describes a method of protecting electronics, the method including: in response to detecting an outlet powered by a power supply being open circuit, providing a voltage to the outlet, with the power supply, that is a non-zero, sleep-mode voltage; and in response to receiving a signal from an electronic component that is receiving power from the outlet, providing to the outlet, with the power supply, a second, higher voltage This specification also describes a connector for protecting against hot plug events, the connection including; an array of electrical contacts, the array of electrical contacts including; a first power contact located at a first end of the array; and a control contact located at a second end of the array, the second end and first end of the array being separated by a length of the array, wherein when the connector is not connected, a first non-zero voltage level is provided by a power supply in electrical communication with the connector, when the first power contact and the control contact are connected, the power supply increases the voltage provided to a second, higher voltage, and wherein the first non-zero voltage provided by the power supply provides a signal detected on the power contact.

Turning now to the figures, FIG. 1 shows a system (100) for reducing inrush current to an electronic component (120), the system including; a power supply (110), the power supply providing power at multiple non-zero voltages; and the electronic component (120); wherein, when the electronic component (120) is powered by the power supply, the power supply (110) provides a first non-zero voltage to the electronic component (120) using the output (130) and, in response to a signal (140) from the electronic component (120), provides a second voltage, the second voltage being higher than the first voltage, to the electronic component (120).

The system (100) is a system for reducing inrush current. The system (100) may be part of a larger system. In one example, the system (100) is part of a printer or a printing system. In another example, the system (100) is part of a computer system, for example, a server. The system (100) is useful in devices or systems with components that may be replaced. The described system reduces the potential for damage from inrush currents so that components that might previously not have been suitable for hot swapping may be made hot-swappable, reducing repair time.

The system (100) may be especially useful in systems that already have a power supply (110) providing a first non-zero voltage and a second non-zero voltage. Such systems (100) may be able to incorporate the described design with minimal new components.

The power supply (110) may be in any number of configurations. In one example, the power supply (110) provides multiple voltages simultaneously. In another example, the power supply (110) provides one voltage output that is varied dependent upon inputs the power supply (110) receives. The power supply (110) may include internal transformers to transform voltages to different voltages. The power supply (110) may include fixed transformers and/or variable transformers. The power supply (110) may have fixed output voltages provided at fixed ports. The power supply (110) may have variable output voltages provided at fixed ports.

The power supply (110) may include an indicator to indicate active connections. For example, the device may include a light emitting diode (LED) to indicate that the device is providing the first voltage the output (130). The power supply (110) may include an LED to indicate it is providing the second voltage at the output (130). LEDs may indicate ongoing states and/or transient events. In one example, the LEDs are lit up for a short period of time (e.g., 1 minute) and then are extinguished. This limits the ongoing power use by the LED.

The electronic component (120) may be a subsystem of a larger device. The electronic component (120) and the power supply (110) together form a system (100). The electronic component (120) may be, for example, a finisher on a printing system or a hard drive on a computing system. The electronic component (120) may be any electronic component and/or subsystem powered by a power supply (110). The protections described herein may be included for all subsystem of a system. The protections described herein may be included selectively depending on the specific subsystem and the risk of damage from a hot plug event.

The output (130) between the power supply (110) and the electronic component (120) provides power to the electronic component (120). The output (130) may include a plug and an outlet. The output (130) may include multiple junctions that may be used to disconnect the power supply (110) from the electronic component (120). The output (130) may be a separate power cable. The output (130) may be a multiple wire cable. The use of multiple applied voltages may reduce the technical specifications of the connection due to the reduced peak current.

The signal (140) may be of any form to communicate information from the electronic component (120) to the power supply (110). The signal (140) need not be directly transmitted from the electronic component (120) to the power supply (110). In one example, the signal (140) is transmitted directly from the electronic component (120) to the power supply (110). The signal (140) may be transmitted to a controller that relays the signal to the power supply (110). The signal (140) may be provided on different conductor in a multiple conductor cable connecting the power supply (110) and the electronic component (120). The signal (140) may be a wakeup signal provided by the electronic component (120) to indicate that the electronic component (120) is ready to change power states, One effective approach is to identify a signal already provided by the electronic component (120) to indicate that the electronic component (120) is powered to a first, lower but non-zero voltage. This signal can then be used to indicate that the electronic component is ready to have the provided voltage increased to a second, higher voltage. The signal (140) may be derived from a power rail associated with the electronic component (120). The signal (140) may be a secondary signal indicating that components of the electronic component (120) have completed preliminary operations prior to raising the voltage to the second, higher voltage.

Many subsystems on complex systems include multiple voltage states. For example, a subsystem may have a power off state, a sleep state, a standby state, and an active state, each with different voltages being provided from the power supply. If such states are already present in the system, using the existing, available states as the first and second non-zero voltage states makes integration with existing components easier. In one example, the sleep state is used as the first non-zero voltage and an active or functional state is used as the second voltage. Other combinations may also be useful, including increasing the available voltage in more than two increments. However, in each case, incremental increases of voltage reduce the peak inflow current compared to connecting an unpowered electronic component (120) directly to a high voltage power supply, In one example, the sleep state voltage is less than half the operational voltage of the electronic component (120). For example, the sleep state voltage may be 12 volts and the operational voltage may be 33 volts. The system may include a power off state of 0 volts, a sleep state of 6 volts, a standby state of 12 volts, and an operational state of 17 volts. Other variations including the use of multiple active and inactive states are within the scope of the present disclosure.

The signal (140) may be the sole input used to switch the power provided by the power supply (110) to the electronic component (120) from the first voltage to the second voltage. In other examples, the signal (140) is a necessary but not a sufficient condition for the voltage to be increased to the second voltage. The power supply (110) may delay increasing the voltage provided to the electronic component (120) based on other factors, for example: the available current capacity in the power supply, the timing of demands from other components powered by the power supply, a priority rating of various subsystems and/or components, etc. The expected current draw from the electronic component (120) may be part of the logic used to determine when to increase the voltage provided to the electronic component (120) from the first voltage to the second voltage.

The signal (140) and power provided by the power supply (110) maybe carried on different conductors of a multi-conductor cable. The electronic component (120) may connect to the power supply (110) using a multiple pin connection. In one example, a multiple pin connection includes signal pins/control pins/communications pins on either side of a power pin. The signal pins may both need to be connected prior to increasing the voltage on the power pin from the first non-zero voltage to a second voltage.

The signal (140) may be transmitted over the electrical output (130) providing the voltage from the power supply (110) to the electrical component (120). The signal may be a transient signal and/or a non-direct current provided by the electrical component (110) back on the electrical output (130). In one example, the signal (140) is a high frequency pulse.

In one example, the first voltage is a sleep mode voltage for the electronic component (120) and the second voltage is an active mode voltage for the electronic component (120). The signal (140) from the electronic component (120) may be provided on a power rail. The signal (140) from the electronic component (120) may be a voltage equivalent to the first non-zero voltage. The signal (140) from the electronic component (120) may be formed using logical operations on a plurality of outputs from the electronic component (120). In one example, the signal (140) is formed by using an AND operation on multiple outputs from the electronic component (120). In another example, the signal (140) is formed by using an OR operation of multiple outputs from the electronic component (120), The power supply (110) may provide a third voltage to the electronic component (120) in response to a second signal from the electronic component (120), wherein the third voltage is higher than the first voltage and second voltage. Similarly, any number of discrete increments in raising the first non-zero voltage to the operation voltage may be used to reduce the inflow current. In one example, the second voltage is at least twice the first voltage.

The system (100) may include an inductor on a line transmitting the signal (140) between the electronic component (120) and the power supply (110). The signal (140) may be provided automatically by the electronic component (120) upon receiving the first non-zero voltage from the power supply (110).

The system (100) may compare the signal (140) with the voltage being provided on the output (130). The system may wait for a difference between the voltage provided on the connection and the signal (140) to be within a tolerance before increasing the voltage provided to the electronic component (120) from the first voltage to the second voltage. This may account for capacitive effects in the component (120). In one example, the tolerance is a 10% voltage difference. In another example, an absolute voltage difference of 50 mV may be used. Specific and optimum tolerances depend in part on the characteristics of the power supply (110) and the electronic component (120).

The system (100) may evaluate other inputs when determining the first voltage. The first, non-zero voltage may be variable depending on characteristics of the load and/or power supply. For example, the first, non-zero voltage may be selected based on the draw of the load. The first, non-zero voltage may be selected based on the current capability of the power supply at the first voltage. The first voltage may be selected based on the demands on the power supply so as to prevent brownout. The first voltage may be selected to prevent the power inrush from exceeding a predetermined amperage.

Figure 2:
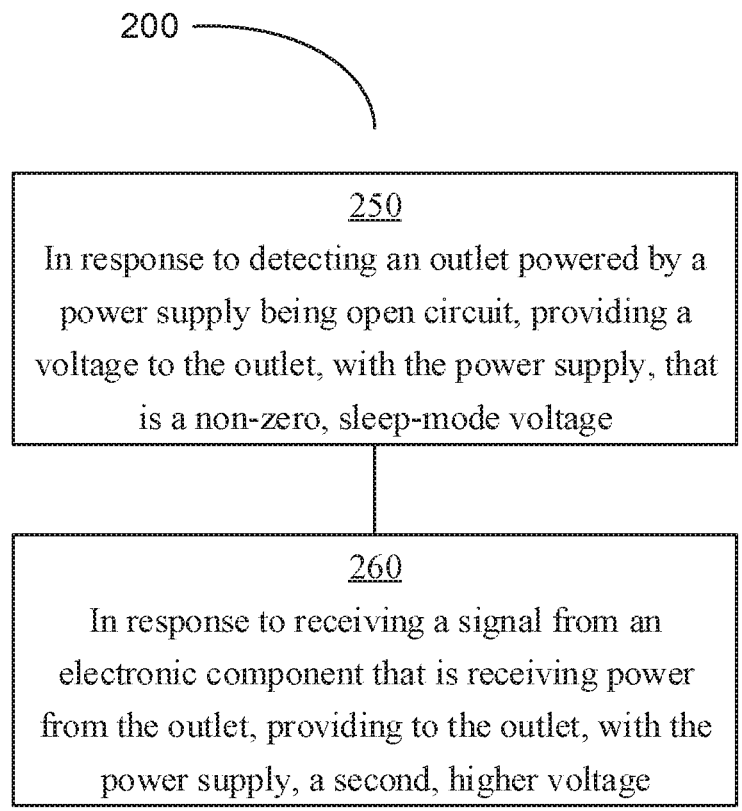
FIG. 2 contains a flowchart of a method of protecting electronics according to the principles described herein.

FIG. 2 contains a flowchart of a method (200) of protecting electronics, the method (200) including: in response to detecting an outlet powered by a power supply being open circuit, providing a voltage to the outlet, with the power supply, that is a non-zero, sleep-mode voltage (250); and in response to receiving a signal from an electronic component that is receiving power from the outlet, providing to the outlet, with the power supply, a second, higher voltage (260).

Operation 250 includes, in response to detecting an outlet powered by a power supply (110) being open circuit, providing a voltage to the outlet, with the power supply (110), that is a non-zero, sleep-mode voltage. Changing the voltage to the sleep-mode voltage when the power supply (110) is disconnected from the electronic component (120) sets the voltage on the outlet so that the outlet will be ready for reconnection with the lower sleep-mode voltage rather than a higher active state voltage. Thus, regardless of the state of the component (120) disconnected from the power supply (110), the method (200) sets the voltage of the unconnected outlet to the sleep-mode voltage.

Operation 260 includes, in response to receiving a signal (140) from an electronic component (120) that is receiving power from the outlet, providing to the outlet, with the power supply, a second, higher voltage. Operation 260 describes the detection of a signal provided by the powered electronic component (120) before increasing the voltage to the second voltage. As the electronic component (120) is powered by the power supply (110), the ability to send a signal depends on power of the first voltage being received by the electronic component (120) and powering the part of the electronic component (120) that generates the signal (140). Thus, the signal (140) indicates the first voltage being supplied to the electronic component (120) and whatever internal checks are performed on the electronic component (120), prior to changing to the higher power state, have been completed. After the electronic component (120) is ready to receive the higher voltage, the signal (140) is provided to the power supply (110) and the voltage is increased to the second voltage.

The method (200) may include additional operations. For example, the method (200) may include detecting a second signal and increasing the voltage to a third voltage. The method (200) may include detecting the signal on a power rail. The method (200) may include the second voltage being an active state voltage for the electronic component (120). The method (200) may include the second voltage being a standby voltage for the electronic component (120). The method (200) may include the second voltage being an operating voltage for the electronic component (120).

Figure 3:
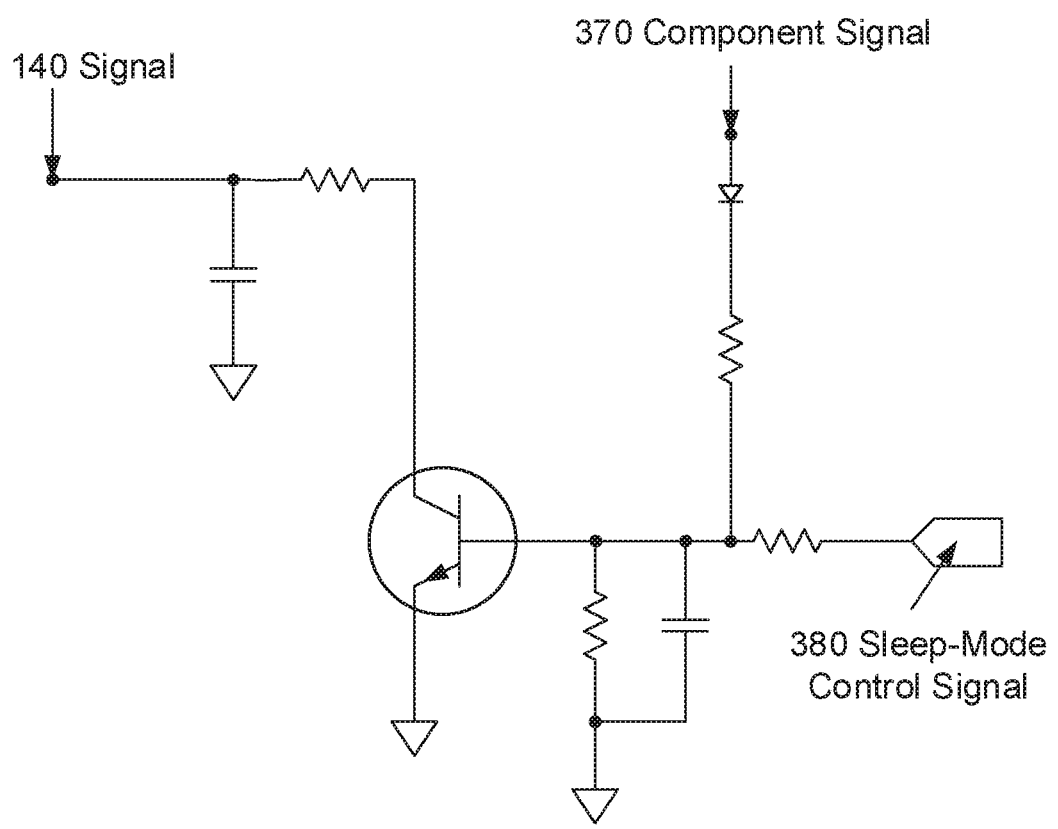
FIG. 3 shows an example of a circuit to generate the signal used to transition the voltage level in the protected device according to the principles described herein.

FIG. 3 shows an example of a circuit to generate the signal used to transition the voltage level in the protected device according to the principles described herein. The circuit receives a sleep mode control signal (380) which provides the normal sleep mode request from the electronic component (120). The circuit also receives a component signal (370) to indicate that it is ready to change to the higher, operating voltage state. These control the output on a transistor. The implementation may depend on what voltages are available from the power supply (110), the signal selected from the electronic component (120) to regulate the voltage change and, the availability of unused capacity and/or cost to add additional components.

The circuit in FIG. 3 is an example of how to create the signal (140) from the protected electronics (120). A sleep mode control signal (380) is provided and additional component signal (370) is provided. These signals (370, 380) are used to produce the signal (140) provided to the power supply (110) to cause the increase in voltage from the first non-zero voltage to the second non-zero voltage.

The component signal (370) may be the output of a circuit and/or logic to assess multiple outputs from the electronic component (120). The component signal may be a power supply output rail. The component signal (370) may be a signal derived from a power supply output rail combined with other outputs from the electronic component (120). For example, more complex logics may be useful when there are multiple modules and/or subsystems powered off of a common power line from the power supply (110). This may be useful when using contacts on either side of a connector to assure connection of all the contacts on a connector, as described below.

The sleep-mode control signal (380) is the regulating signal for the power mode of the power supply during normal operation. The sleep-mode control signal (380) allows the electronics (120) to communicate sleep requests and status to the power supply, allowing a reduction in power consumption.

Figure 4A:
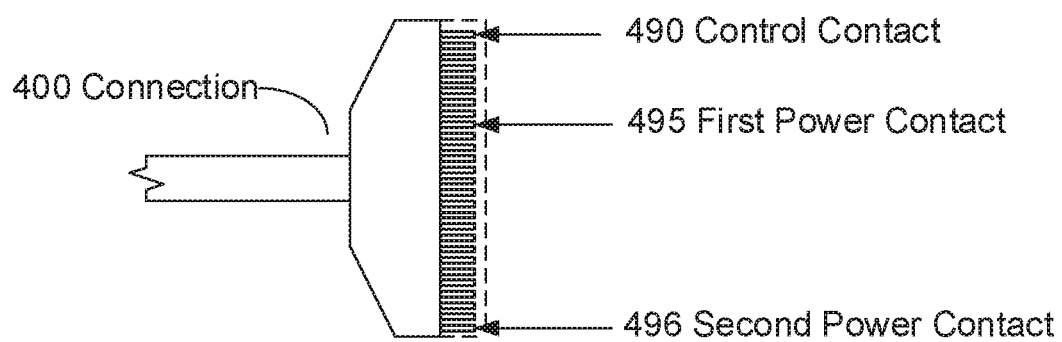
FIGS. 4A and 4B show examples of connectors used in two implementation of a protective design according to the principles described herein.

FIG. 4A shows an example connector (400) used in one implementation of a protective design according to the principles described herein. The connector (400) includes a control contact (490) and a first power contact (495). When the connector is connected to the port or plug, the control contact (490) and the first power contact (495) both are required in order for the power supply (110) to increase the voltage provided to the electronic component (120) from a first non-zero voltage to a second, higher voltage. This avoids the inrush current that would otherwise occur from going directly from unpowered to the second voltage. While the control contact (490) and the first power contact (495) are shown at the ends of the array of contacts, other variations are possible. However, the purpose of spacing the control contact (490) and the first power contact (495) apart from each other is to assure all of the contacts are made before and/or simultaneously with the control contact (490) and power contact (495) being connected. This avoids the voltage from the power supply (110) being increased before some of the contacts are connected.

For example, if the connector (400) has both the control contact (490) and the first power contact (495) at the same end of the connector, and the connector (400) is inserted at an angle and then seated, the situation could occur where the control contact (490) and first power contact (495) connected prior to the second power contact (496). This could cause the signal (140) on the control contact (490) to cause the voltage to the electronic component (120) to be increased to the second, higher voltage prior to contact by the power contact (496), producing a hot plug event with excessive inrush current. In contrast, by having the control and first power contact (495) located on opposite sides of the array, and verifying both contacts (490, 495) are engaged prior to increasing the voltage applied, a hot plug event with excessive inrush current is avoided even if the contacts are not connected simultaneously due to an angled connection.

Figure 4B:
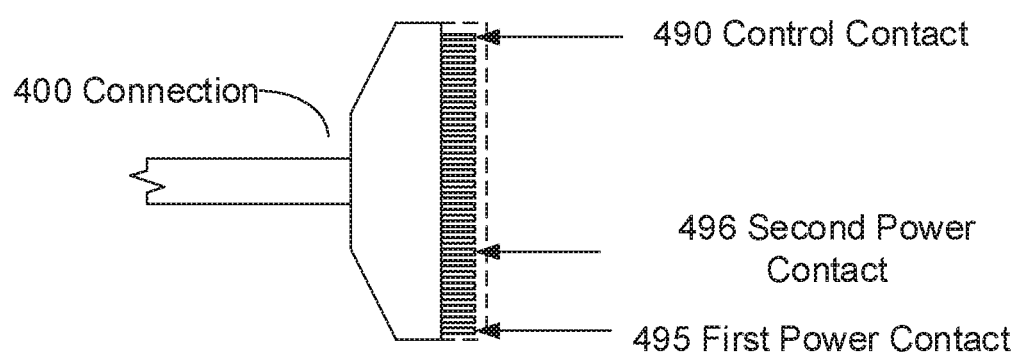

FIG. 4B shows an example connector (400) used in one implementation of a protective design according to the principles described herein. The connector (400) includes a control contact (490), a first power contact (495) and a second power contact (496). In one implementation, both power contacts (495, 496) must be connected before the power supply (110) increase the voltage from the first voltage to the second voltage. By positioning the control contact (490) and the power contacts (495) such that for the control contact (490) and the first power contacts (495) to be engaged it requires that all the contacts in the array are engaged, this approach avoids a hot plug event with excess inrush current.

FIG. 4B shows the control contact (490) and a first power contact (495) at opposite ends of the array. However, as long as the contacts (490, 495) are sufficiently separated so as to require all the contacts, including the second power contact (496), to engage in order for the control contact (490) and all the power contacts (495) to engage, the design will function as intended. This approach may be used with standard connectors of uniform pin length.

Another feature of this disclosure involves hardware circuit design which helps guarantee a misaligned connector insertion does not result in a hot-plug event. This is accomplished by using the power supply voltage rails at the opposite end of the connector, relative to a sleep voltage pin. The hardware circuit uses the power supply voltage rails at the opposite end of the connector to enable a switch which tells the power supply to go to the high voltage mode. This is done because if the end of the connector where the sleep mode pin is plugged in first, the power supply voltage rail could get plugged in next. If this voltage were used to enable the switch to tell the power supply to go to high voltage, the power supply rails would all be going to high voltage and the possibility exists that the final out pins of the connector would be at high voltage by the time those pins get plugged in. This is a real possible event that could happen because of the type of connector used (single in-line row of pins, where the pin count is high). A person can plug in the connector in a left to right fashion (as opposed to plugging in the connector in one perfectly level fashion). The left to right motion of plugging in the cable will mate the pins of the left side first, and the right side last. This can lead to a hot plug event on the right side pins, if the hardware circuit implemented were not present. The additional hardware circuit makes the insertion of the connector independent of how the connector is plugged in.

It will be apparent that, within the principles described by this specification, a vast number of variations exist. It should also be understood that the examples described are simply examples, and are not intended to limit the scope, applicability, or construction of the claims in any way.

What is claimed is:

1. A system for reducing inrush current to an electronic component, the system comprising:
 a power supply, the power supply providing power at multiple non-zero voltages; and
 the electronic component;
 wherein, when the electronic component is connected to the power supply, the power supply provides a first non-zero voltage to the electronic component and, in response to a signal from the electronic component, provides a second voltage, the second voltage being higher than the first voltage, to the electronic component.

2. The system of claim 1, wherein a first component of the system has a sleep mode and the power supply is structured to selectively output a sleep mode voltage to the first component when in a sleep mode, and the first voltage is the sleep mode voltage.

3. The system of claim 1, wherein the first voltage is a variable voltage based on available capacity in the power supply.

4. The system of claim 1, wherein the signal from the electronic component is a voltage derived from the first non-zero voltage.

5. The system of claim 1, wherein the signal from the electronic component is formed using an AND operation on a plurality of outputs from the electronic component, wherein the plurality of outputs comprise two connections of a multiple connection pin and the power from the power supply to the electronic component is provided on a connection located between the two connections providing the signal.

6. The system of claim 1, wherein the power supply provides a third voltage to the electronic component in response to a second signal from the electronic component, wherein the third voltage is higher than the first voltage and second voltage.

7. The system of claim 1, wherein the second voltage is at least twice the first voltage.

8. The system of claim 1, wherein the second voltage is an operating voltage for the electronic component.

9. The system of claim 1, wherein the signal is provided automatically by the electronic component upon receiving the first non-zero voltage from the power supply.

10. The system of claim 1, further comprising a circuit providing an OR operation, the circuit connected to multiple outputs of the electronic component, the OR operation to output the signal to the power supply to increase voltage output.

11. The system of claim 1, wherein an output of the power supply to the electronic component comprises an outlet into which the electronic component is plugged.

12. The system of claim 1, wherein the electronic component outputs the signal in response to components of the electronic component having completed a preliminary operation.

13. The system of claim 1, further comprising a multiple-conductor cable connecting the power supply and the electronic component, wherein the signal is provided on a different conductor from conductors of the cable providing the first and second voltages in the cable.

14. A method of protecting electronics, the method comprising:
in response to detecting an outlet powered by a power supply being open circuit, providing a voltage to the outlet, with the power supply, that is a non-zero, sleep-mode voltage; and
in response to receiving a signal from an electronic component that is receiving power from the outlet, providing to the outlet, with the power supply, a second, higher voltage.

15. The method of claim 14, wherein the signal is derived from a voltage on a power rail.

16. The method of claim 14, wherein the second, higher voltage is an active state voltage of the electronic component.

17. A connector for protecting against hot plug events, the connection comprising:
an array of electrical contacts, the array of electrical contacts comprising:
a first power contact located at a first end of the array; and
a control contact located at a second end of the array, the second end and first end of the array being separated by a length of the array,
wherein when the connector is not connected, a first non-zero voltage level is provided by a power supply in electrical communication with the connector, and
wherein, only when the first power contact and the control contact are connected, the power supply increases the voltage provided to a second, higher voltage in response to a control signal.

18. The connector of claim 17, wherein the array comprises a plurality of power contacts.

19. The connector of claim 17, wherein the array of electrical contacts is a linear array of one side of pin-socket connectors.

20. The connector of claim 17, wherein the electrical contacts are pins and two different signal pins must be connected before the power supply increases the voltage provided to the second, higher voltage.

* * * * *